(12) United States Patent
Okayama

(10) Patent No.: US 9,319,540 B2
(45) Date of Patent: Apr. 19, 2016

(54) IMAGE FORMING APPARATUS, CONTROL METHOD THEREFOR AND STORAGE MEDIUM

(75) Inventor: Noritsugu Okayama, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 218 days.

(21) Appl. No.: 13/292,263

(22) Filed: Nov. 9, 2011

(65) Prior Publication Data

US 2012/0120418 A1  May 17, 2012

(30) Foreign Application Priority Data

Nov. 12, 2010  (JP) ................. 2010-253899

(51) Int. Cl.
G06F 3/12 (2006.01)
G06F 15/00 (2006.01)
G06K 15/22 (2006.01)
G06K 15/10 (2006.01)
H04N 1/00 (2006.01)
H04N 1/333 (2006.01)

(52) U.S. Cl.
CPC ....... H04N 1/00408 (2013.01); H04N 1/00482 (2013.01); H04N 1/00708 (2013.01); H04N 1/00779 (2013.01); H04N 1/33315 (2013.01); H04N 2201/0094 (2013.01); H04N 2201/33321 (2013.01)

(58) Field of Classification Search
CPC .. B41J 11/0095; B41J 13/0054; B41J 13/103; B65H 2407/21; B41C 1/055
USPC ............ 358/300, 1.13, 449; 399/370, 81, 367
See application file for complete search history.

(56) References Cited

U.S. PATENT DOCUMENTS

| | | | | |
|---|---|---|---|---|
| 4,729,038 A | * | 3/1988 | Miura ................ | G06K 15/1276 347/247 |
| 4,849,790 A | * | 7/1989 | Ito ................................. | 399/367 |
| 5,150,224 A | * | 9/1992 | Mizude et al. ................ | 358/449 |
| 5,223,904 A | * | 6/1993 | Umezawa ..................... | 399/376 |
| 5,610,407 A | * | 3/1997 | Baba ........................ | 250/559.24 |
| 5,923,942 A | * | 7/1999 | Nuggehalli et al. .......... | 399/389 |

(Continued)

FOREIGN PATENT DOCUMENTS

| | | | |
|---|---|---|---|
| JP | 6268928 U | 4/1987 | |
| JP | 62270974 A | 11/1987 | |

(Continued)

OTHER PUBLICATIONS

Japanese Office Action issued in corresponding Japanese Patent Application No. 2010253899, dated Mar. 24, 2015.

(Continued)

*Primary Examiner* — Akwasi M Sarpong
(74) *Attorney, Agent, or Firm* — Rossi, Kimms & McDowell LLP

(57) ABSTRACT

An image forming apparatus that enables to suppress the cost rise caused by increasing the number of sensors for original size detection and suppress the degradation of user operability. Paper sizes of papers are registered on a plurality of paper supplying units in advance. One of the registered paper sizes is determined as the original size if the original size cannot be detected by a detecting unit. An image of the original is formed on a paper, which corresponds to the original size determined by the determining unit and is fed from the paper supplying unit.

6 Claims, 13 Drawing Sheets

(56) References Cited

U.S. PATENT DOCUMENTS

| | | | |
|---|---|---|---|
| 6,701,124 B2* | 3/2004 | Sakai et al. | 399/370 |
| 7,173,718 B2* | 2/2007 | Iwata et al. | 358/1.13 |
| 7,761,021 B2* | 7/2010 | Takeuchi | 399/81 |
| 8,305,654 B2* | 11/2012 | Takeshima | G03B 27/527 358/1.15 |
| 2004/0165223 A1* | 8/2004 | Ishido | H04N 1/00551 358/449 |
| 2005/0189694 A1* | 9/2005 | Kotani | B41J 11/0095 271/9.09 |
| 2005/0243153 A1* | 11/2005 | Takahashi | B41L 13/06 347/101 |
| 2009/0080031 A1* | 3/2009 | Ishido | H04N 1/00551 358/449 |
| 2009/0122357 A1* | 5/2009 | Ishido | H04N 1/00551 358/449 |

FOREIGN PATENT DOCUMENTS

| | | | |
|---|---|---|---|
| JP | 08-087146 A | | 4/1996 |
| JP | 11231726 A | | 8/1999 |
| JP | 2000007160 A | | 1/2000 |
| JP | 2006050376 | * | 2/2006 |
| JP | 2006050376 A | | 2/2006 |

OTHER PUBLICATIONS

Japanese Office Action dated Aug. 19, 2014 issued in corresponding JP Application No. 2010-253899.

Office Action issued in Japanese Application No. 2010-253899 dated Jun. 8, 2015.

Japanese Decision to Dismiss an Amendment issued in Japanese counterpart application No. JP2010-253899, Dec. 15, 2015.

* cited by examiner

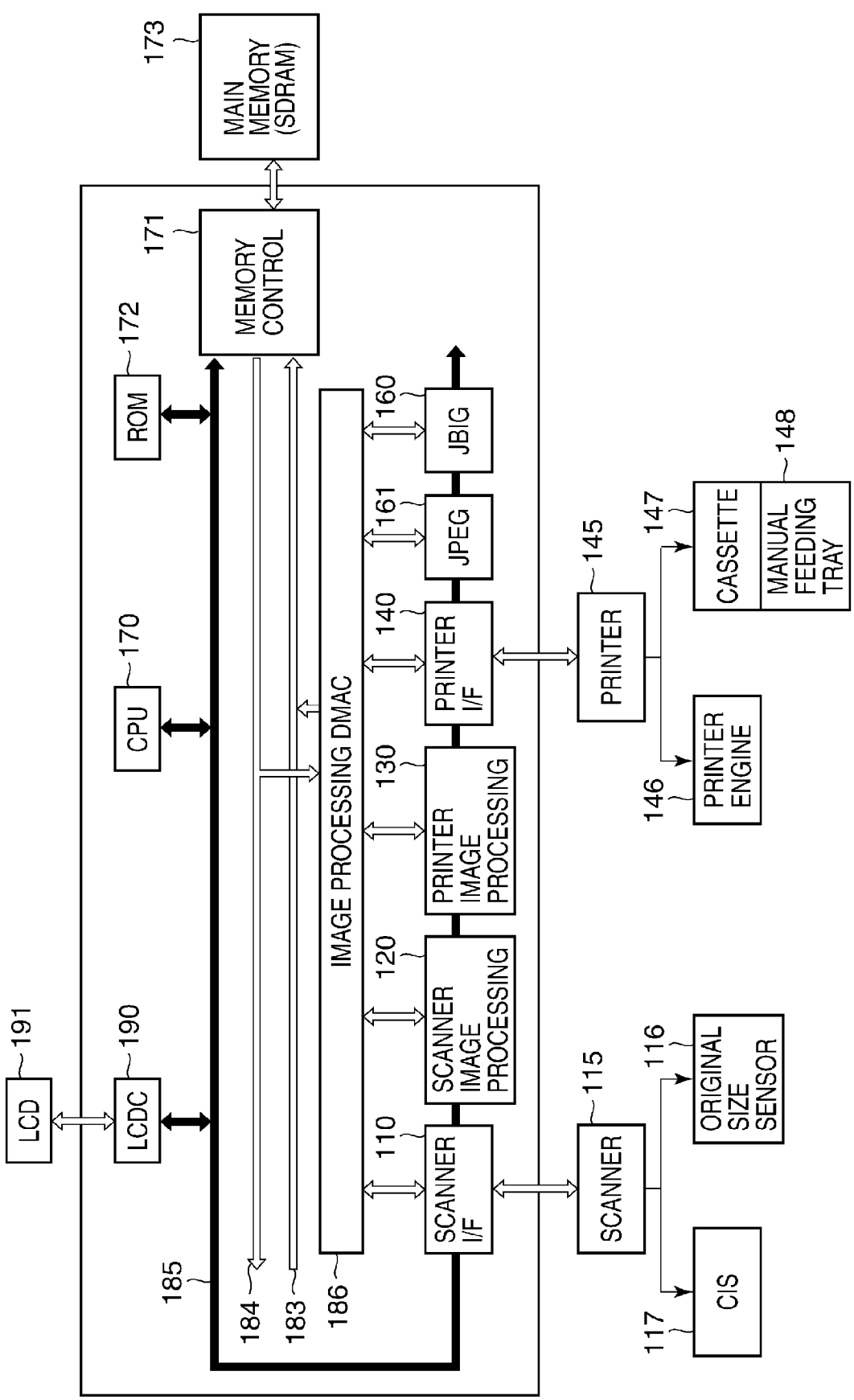

ORIGINAL SIZE SENSOR 1 DETECTING LONG SIDE LENGTH
ORIGINAL SIZE SENSOR 2 DETECTING LONG SIDE LENGTH

STMT / LTR / LGL

PLATEN
CIS UNIT MOVEMENT DIRECTION
A5 / B5 / A4
CIS UNIT
ORIGINAL SIZE SENSOR 1a
ORIGINAL SIZE SENSOR 2a

FIG.7

UPPER STAGE   AB-TYPE STANDARD
LOWER STAGE   USA STANDARD

| SET ORIGINAL | SENSOR 1 | SENSOR 2 | DETECTION RESULT |
|---|---|---|---|
| A5 | OFF | OFF | UNDETERMINED |
| B5 | OFF | OFF | UNDETERMINED |
| A4 | ON | OFF | A4 |

| SET ORIGINAL | SENSOR 1 | SENSOR 2 | DETECTION RESULT |
|---|---|---|---|
| STMT | OFF | OFF | UNDETERMINED |
| LTR | ON | OFF | LTR |
| LGL | ON | ON | LGL |

FIG.8

PREFERENTIAL ORIGINAL SIZE REGISTRATION SCREEN

REGISTER PREFERENTIAL ORIGINAL SIZE WHEN ORIGINAL SIZE IS UNDETERMINED

◀ | NOT DESIGNATED (SELECTION UPON READING) | STMT | B5 | A5 | ▶

IMAGE FORMING APPARATUS, CONTROL METHOD THEREFOR AND STORAGE MEDIUM

BACKGROUND OF THE INVENTION

1. Field of the Invention

The present invention relates to an image forming apparatus, a control method for the image forming apparatus and a storage medium.

2. Description of the Related Art

Copy functions of recent image forming apparatuses include a so-called automatic sheet selection function for automatically detecting the original size and automatically determining a recording sheet based on the detected original size.

One example of conventional automatic sheet selection functions has been proposed for registering in advance original groups used by users and thereby decreasing the number of original sizes to be detected by an apparatus to reduce erroneous detection (for example, see Japanese Laid-Open Patent Publication (Kokai) No. H08-087146).

However, in a conventional image forming apparatus as described above, it is necessary to set the number of sensors proportional to the number of different sizes of multiple originals to detect the sizes of the originals having respective sizes belonging to at least one group. Therefore, there is a problem that the number of used sensors increases, which makes the apparatus expensive.

To cope with this, in the case of configuring an image forming apparatus with less number of sensors to detect the original sizes, the original sizes may not be detected and hence the user requires an operation of manually inputting the original size to be used. That is, in such an image forming apparatus with less number of sensors, there is a problem that the operability is degraded.

SUMMARY OF THE INVENTION

Accordingly, the present invention provides an image forming apparatus having a plurality of paper supplying units, comprising a registering unit configured to register paper sizes of papers on the plurality of paper supplying units, a detecting unit configured to detect an original size, a determining unit configured to determine one of the paper sizes of the papers registered on the plurality of paper supplying units as the original size if the original size cannot be detected by the detecting unit, and an image forming unit configured to form an image of the original on a paper, which corresponds to the original size determined by the determining unit and is fed from the paper supplying unit.

According to the present invention, in an image forming apparatus, it is possible to suppress the cost rise caused by increasing the number of sensors for original size detection and suppress the degradation of user operability.

The features and advantages of the invention will become more apparent from the following detailed description taken in conjunction with the accompanying drawings.

BRIEF DESCRIPTION OF THE DRAWINGS

FIG. 1 is a block diagram showing a schematic configuration of an image forming apparatus according to the embodiment of the present invention.

FIG. 7 is a view which is used in explaining combinations of originals and original size detection results in the image forming apparatus of FIG. 1, where the combinations are used to determine the original sizes.

FIG. 8 is a view which is used in explaining a screen to register the priority order of original sizes in the image forming apparatus of FIG. 1.

DESCRIPTION OF THE EMBODIMENTS

Figure 2A:
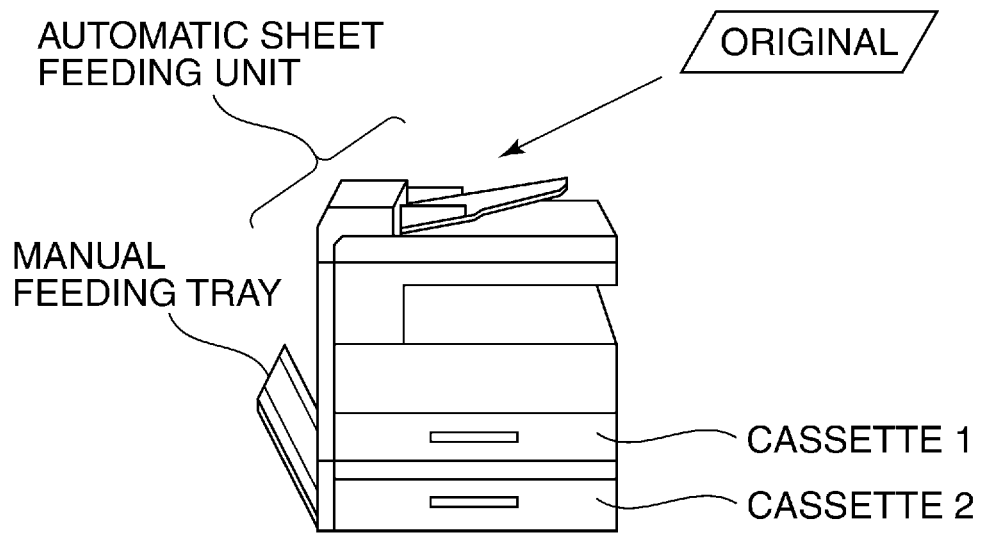
FIGS. 2A and 2B are perspective views showing an appearance of the image forming apparatus of FIG. 1.

Embodiments of the present invention will be explained below in detail using the drawings.

FIG. 1 is a block diagram showing a schematic configuration of an image forming apparatus according to the embodiment of the present invention.

In FIG. 1, a scanner 115 is configured to be able to scan originals in a CIS unit 117. Image data obtained by scanning by the scanner 115 is DMA-transferred by a memory control unit 171 via a scanner interface (hereinafter referred to as "scanner I/F") 110 and accumulated in a main memory (SDRAM) 173.

The image data extracted in the main memory 173 through processing in the scanner I/F 110 is subjected to image processing depending on an image processing operation mode (such as a color scan or a monochrome scan) in a scanner image processing unit 120.

The image data subjected to the image processing in the scanner image processing unit 120 is transferred to a printer image processing unit 130 and subjected to an area edition and resolution conversion. This scanner image processing unit 120 functions as a processing unit for a print output of image data and outputs the image processing result to a printer 145 which is connected to the scanner image processing unit 120 via a printer interface (I/F) 140.

A JBIG 160 and a JPEG module 161 are processing units to execute compression and expansion processing of image data compliant with predetermined standards.

A CPU 170 reads out and executes programs stored in a ROM 172 and thereby controls the overall operation of the image forming apparatus. The memory control unit 171 carries out data transfer control to write data into and read out it from the main memory (SDRAM) 173.

The ROM 172 stores various programs to control the image forming apparatus. These programs are read by the CPU 170 at the time of startup of the image forming apparatus and extracted by the main memory 173 and executed.

In cooperation with the memory control unit 171, an image processing DMA controller (DMAC) 186 carries out data transfer between each image processing unit (110, 120, 130, 140, 161, 160) and the main memory 173. Together with this, the image processing DMA controller 186 generates and sets predetermined address information to execute DMA control of the data transfer.

For example, this image processing DMA controller 186 generates address information per DMA channel for carrying out a DMA transfer of image data subjected to reading processing in the scanner I/F 110 to the main memory 173. Further, the image processing DMA controller 186 functions as, for example, a unit to generate address information for reading image data extracted in the main memory 173, according to a DMA channel, and to carry out a DMA transfer of the address information to the scanner image processing unit 120. That is, in cooperation with the memory control unit 171, the image processing DMA controller 186 manages the main memory 173 and DMA control between each image processing unit (110, 120, 130, 140, 160, 161) and the main memory 173.

A first BUS 183 transmits data read from the main memory 173, to each processing unit of an image processing system. Also, a second BUS 184 transmits data read from each processing unit of the image processing system to the main memory 173. These first BUS 183 and second BUS 184 cooperatively carry out an image data transfer between image processing blocks and the main memory 173.

A third BUS 185 is connected to control registers in the CPU 170 and each image processing unit (110, 120, 130, 140, 161, 160).

An LCDC 190 connected to this third BUS 185 denotes a unit to manage display control for displaying, for example, various settings and processing states of the image forming apparatus in an LCD 191, which is a display unit. The LCD 191 is integrally configured with a touch panel. The LCD 191 displays an operation screen, receives operations from the user and informs the CPU 170 of the content of the received operations. It should be noted that hardware keys may be provided as an operation unit other than the LCD with the touch panel.

Next, the scanner and printer attached to the image forming apparatus body configured as above will be explained in detail.

This scanner 115 is provided with an original size sensor 116 for detecting the size of an original set in, for example, the platen and the automatic sheet feeding unit. Original size information detected by this original size sensor 116 is stored in the main memory 173 through the scanner I/F 110.

Meanwhile, the printer 145 attached to the image forming apparatus body is configured with a printer engine unit 146, a cassette 147 and a manual feeding tray 148 (paper supplying unit). This cassette 147 is configured with a plurality of cassettes, and papers in each of respective sizes can be set on each of the cassettes and the manual feeding tray.

In this printer 145, printing of image data stored in the main memory 173 is executed by the printer engine 146 on a paper (which is also referred to as "recording paper" or "sheet") set on the cassette 147 or the manual feeding tray 148.

Also, size information of papers set on each cassette 147 or the manual feeding tray 148 is obtained by a paper size information obtaining unit for obtaining paper size information which is conventionally known. Then, the obtained paper size information is stored in the main memory 173 via the printer 145 and the printer I/F 140.

Figure 2B:
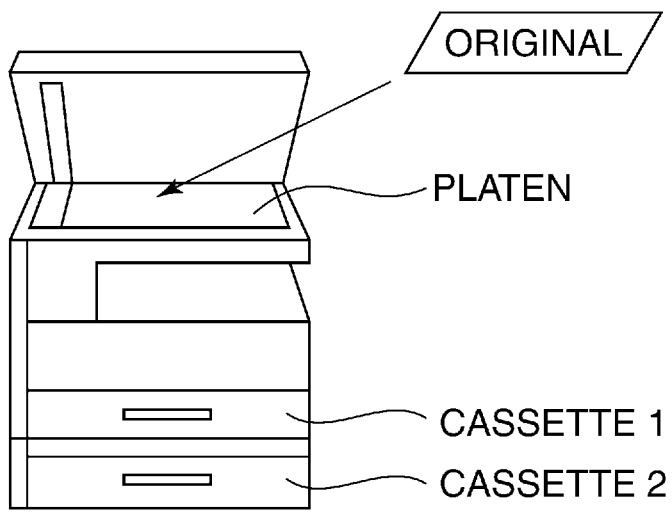

FIGS. 2A and 2B are perspective views showing an appearance of the image forming apparatus of FIG. 1.

As shown in FIGS. 2A and 2B, the scanner 115 of the image forming apparatus of FIG. 1 is provided with an automatic sheet feeding unit and platen on which an original can be placed. The scanner 115 can read originals in six kinds of sizes of A4, B5, A5, STMT (statement), LTR (letter) and LGL (legal). It should be noted that the size of STMT is 39.7×215.9 mm. The size of LTR is 215.9×279.4 mm. The size of LGL is 215.9×355.6 mm. Also, it is possible to place papers of different sizes on a cassette 1, cassette 2 and manual feeding tray of the image forming apparatus, respectively.

Figure 3:
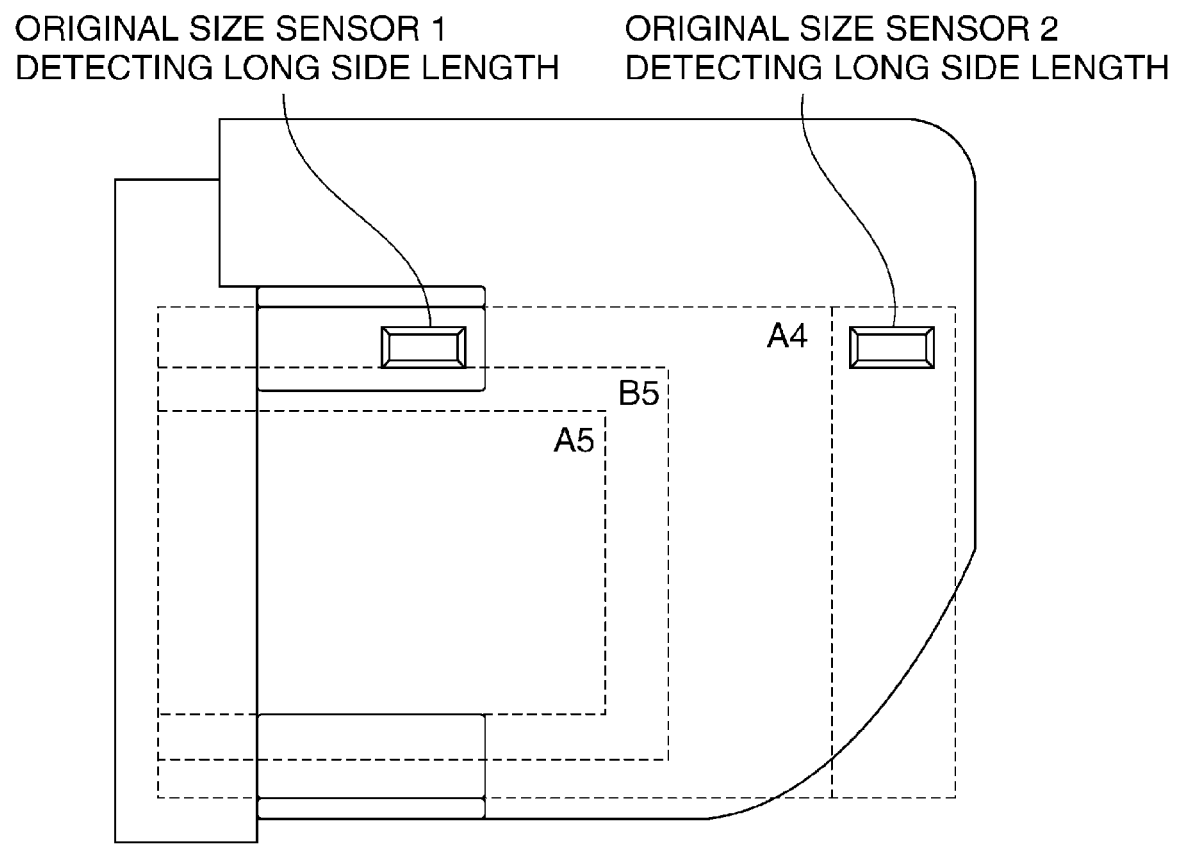
FIG. 3 is a view which is used in explaining an arrangement of original size sensors in an automatic sheet feeding unit of a scanner in the image forming apparatus of FIG. 1.

As shown in FIG. 3, the automatic sheet feeding unit of the scanner 115 is provided with photo-interrupter-type original size sensors 1 and 2 for detecting an original, where these sensors are configured such that sensor outputs are changed from OFF to ON when the original is placed.

Figure 4:
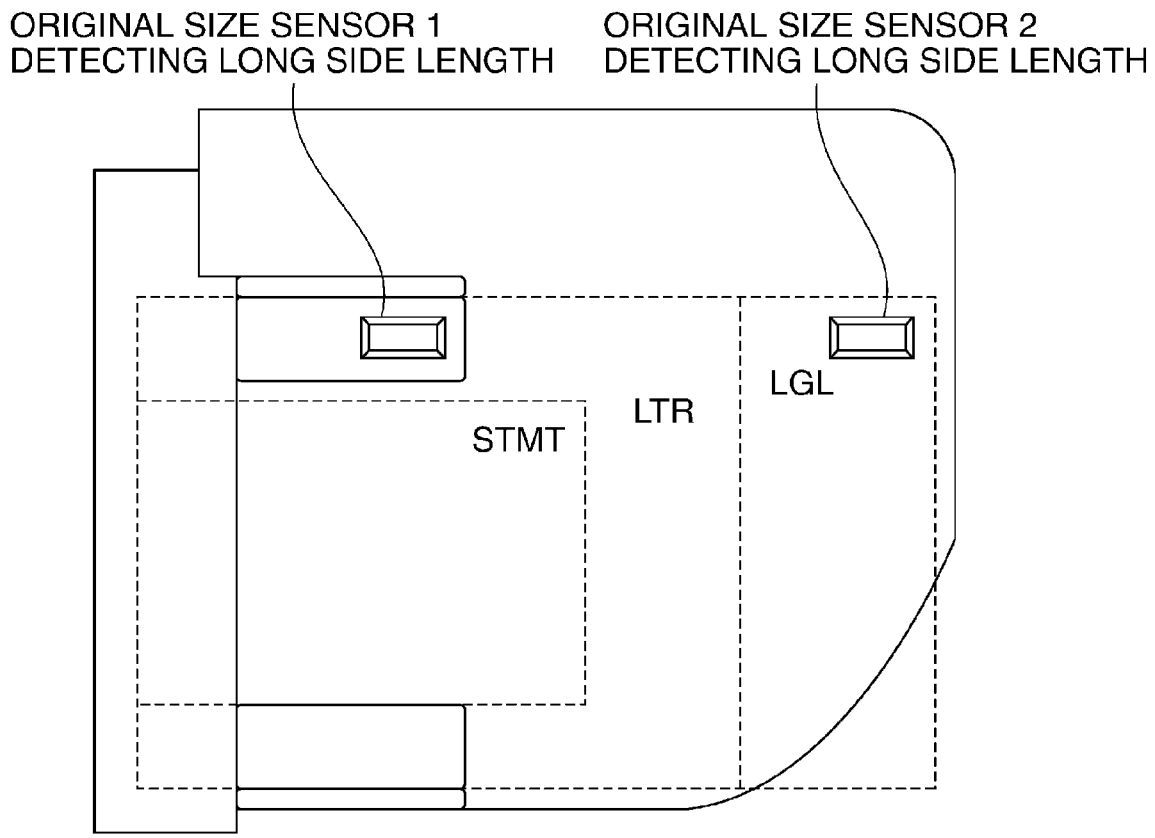
FIG. 4 is a view which is used in explaining a first variation of an arrangement of original size sensors in the automatic sheet feeding unit of the scanner in the image forming apparatus of FIG. 1.

FIG. 4 is a view which is used in explaining a first variation of an arrangement of original size sensors in the automatic sheet feeding unit of the scanner 115 and which shows an automatic sheet feeding unit provided with sensors in the same positions as the arrangement of FIG. 3, where the automatic sheet feeding unit is set to a specification for USA (United States of America) market. The automatic sheet feeding unit according to the specification for USA (United States of America) market shown in FIG. 4 is configured such that, if an LTR original is placed, only the original size sensor 1 is turned on, and, if an LGL original is placed, both sensors are turned on.

In the image forming apparatus of FIG. 1, the detection result is checked against combinations shown in FIG. 7 to determine an original size. For example, in a case where an A5 or B5 original is placed, the original size sensors 1 and 2 do not detect the original and are turned off, and the original size is determined to be "undetermined" ("unknown"). Also, in a case where an A4 original is placed, the sensor 1 is turned on and the original size is adequately determined to be A4.

Figure 5:
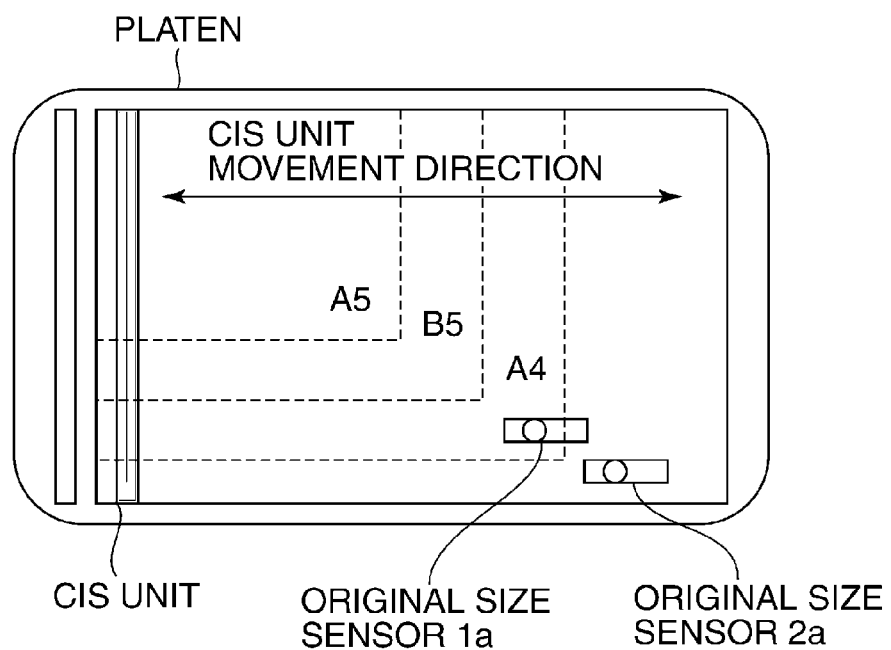
FIG. 5 is a view which is used in explaining operations of the original size sensors in a platen of the scanner in the image forming apparatus of FIG. 1.
Figure 6:
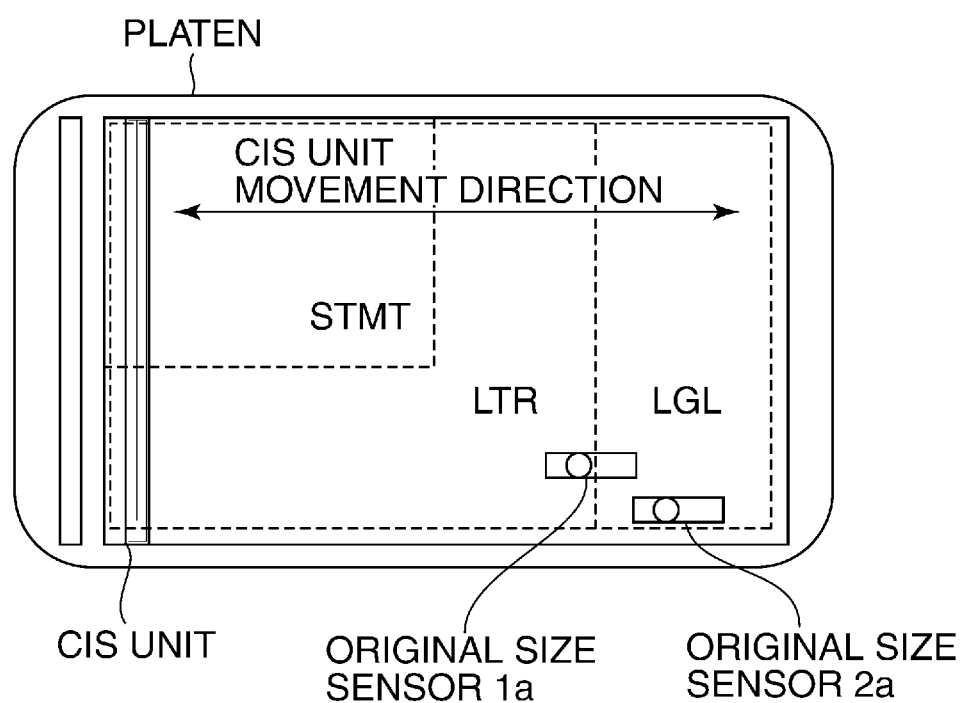
FIG. 6 is a view which is used in explaining operations of original size sensors in the platen of the scanner in the image forming apparatus of FIG. 1.

Next, operations of the original size sensors 1 and 2 for detecting an original on the platen of this scanner 115, will be described with reference to the platen plane views of FIGS. 5 and 6.

Similar to the automatic sheet feeding unit, the platen of this scanner 115 is provided with original size sensors 1a and 2a to detect an original. The original size sensors 1a and 2a are each configured with reflective sensors, and reflect the light emitted by LED and determine whether there is an original on the sensors. Then, if there is the original, the sensors are turned on, and, if there is no original, the sensors are turned off.

For example, in a case where an original of the size of A5 or B5 is provided, the original size sensors 1a and 2a are both turned off. Also, in the case of an LTR original, only the original size sensor 1a is turned on. Even in the case of the platen in this scanner 115, original size sensor ON/OFF condition is checked against the combinations shown in FIG. 7 to determine the original size. It should be noted that combinations different from the combinations shown in FIG. 7 may be used for the check as long as it is possible to detect the original size.

Next, with reference to FIG. 8, a case will be explained for registering original sizes which are preferentially used when the original size detection result is undetermined (undetected) from output patterns of the sensors of the original size sensor 116 in FIG. 1.

FIG. 8 is a view which is used in explaining a screen to register the priority order of original sizes in the image forming apparatus of FIG. 1.

The screen to register the original sizes shown in FIG. 8 is displayed on the LCD (191) when a predetermined operation is received in the LCDC (190). This screen display is provided for the user to select "not designated" or one of sizes of "STMT," "B5" and "A5" which cannot be detected by the original size sensor of FIGS. 3, 4, 5 and 6. A4 is a size that can be detected by the original size sensor 116, and therefore is not displayed as options. Using the CPU 170, information selected by operating the screen to register the original sizes shown in this FIG. 8 is stored in the main memory 173 via the memory control unit 171.

Next, process to determine an original size at the start time of copy job will be explained with reference to the flowchart of FIG. 9.

Figure 9:
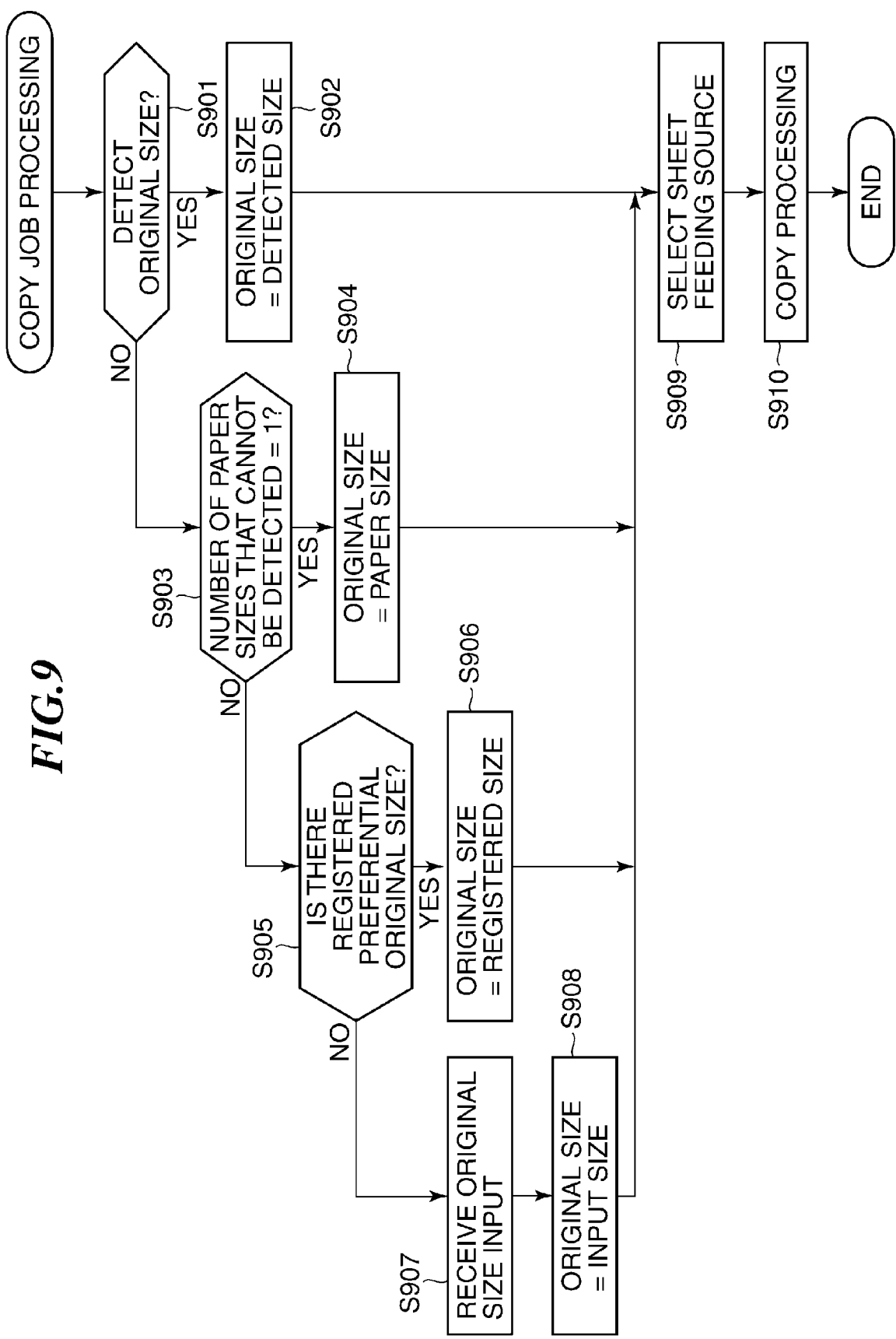
FIG. 9 is a flowchart showing copy job processing which is executed in the image forming apparatus of FIG. 1 to determine the original size at the start of a copy job.

FIG. 9 is a flowchart showing copy job processing which is executed in the image forming apparatus of FIG. 1 to determine the original size at the start of a copy job. Each step shown in the flowchart of FIG. 9 is performed by executing, in the CPU 170, programs stored in the ROM 172.

This copy job processing is started when the CPU 170 receives an operation to start the copy job through a start key included in an operation unit (such as the LCD 191 and hardware keys).

First, the CPU 170 as a control unit checks the original size based on a detection result in the original size sensor 116 (step S901). For example, if the original size sensor 1 is turned on and the original size sensor 116 detects the original size ("YES" in step S901), the CPU 170 refers to FIG. 7 and determines that the original size is A4 included in the detection result sizes (step S902).

Next, the CPU 170 specifies suitable papers to record the scanned original, from the original size and size information on papers set in the cassette 147 or manual feeding tray 148, and selects, as a sheet feeding source, a cassette or tray in which the designated papers are set (step S909). For example, in a case where A4, A5 and B5 papers are respectively set in the cassette 1 (147), the cassette 2 (147) and the manual feeding tray (148), the cassette 1 in which the same paper size as the original size is set, is selected as a sheet feeding source.

Next, the CPU 170 carries out copy processing (step S910). Specifically, the CPU 170 reads an original image using the scanner 115, feeds a paper from the sheet feeding source selected in step S909, carries out copy processing to form the original image on the fed paper (step S910) and terminates the present copy job processing.

By contrast with this, if the original size cannot be detected in step S901 ("NO" in step S901), the flow proceeds to step S903 and the CPU 170 determines whether the number of paper sizes that cannot be detected is one.

In the image forming apparatus according to the present embodiment, if the CPU 170 cannot detect the original size using the original size sensor 116 of the scanner 115, the CPU 170 determines that the original size that cannot be detected is smaller than the original sizes that can detected using the original size sensor 116. For example, in a case where: A4 originals are placed in the cassette 1; A5 originals are placed in the cassette 2; no paper is placed in the manual feeding tray; and an A4 original can be detected using the original size sensor 116, an original size that cannot be detected is only A5 placed in the cassette 2. That is, the number of paper sizes that cannot be detected is one.

Next, if the number of paper sizes that cannot be detected is determined to be one ("YES" in step S903), the CPU 170 regards, as the original size, the paper size that cannot be detected (step S904). In the case of the above example, A5 of the cassette 2 is regarded as the original size by the CPU 170.

Next, according to automatic paper selection processing, the CPU 170 selects the cassette 2 in which A5 papers are set, as a sheet feeding source (step S909). Then, the CPU 170 carries out copy processing (step S910). Specifically, the CPU 170 reads an original image using the scanner 115, feeds a paper from the paper supplying unit selected in step S909, carries out copy processing to form the original image on the fed paper (step S910) and terminates the present copy job processing.

Also, in step S903, for example, in a case where A4, A5 and B5 papers are respectively set in the cassette 1, the cassette 2 and the manual feeding tray, papers that cannot be detected are the A5 papers of the cassette 2 and the B5 papers of the manual feeding tray. In this case, the number of paper sizes that cannot be detected is two ("NO" in step S903) and therefore the flow proceeds to step S905.

Next, the CPU 170 determines whether a preferential original size is registered in advance in the main memory 173 (step S905). Here, as explained in above-noted FIG. 8, the preferential original size denotes information which is registered in advance by the user and which corresponds to original size information such as STMT, B5 and A5 that cannot be detected by the original size sensor.

Then, if the CPU 170 determines that there is a registered preferential original size ("YES" in step S905), the CPU 170 sets the original size to the registered size (step S906). For example, if B5 is registered as a preferential original size, the original size is regarded as B5.

Next, through the automatic paper selection processing in step S909, the CPU 170 selects a cassette or manual feeding tray in which B5 papers are set, and feeds the papers (step S909). Then, the CPU 170 regards the original size as B5, and, according to image data scanned in the scanner 115, feeds papers from the sheet feeding source selected in step S909, carries out copy processing for image formation (step S910) and terminates the present copy job processing.

Figure 12:
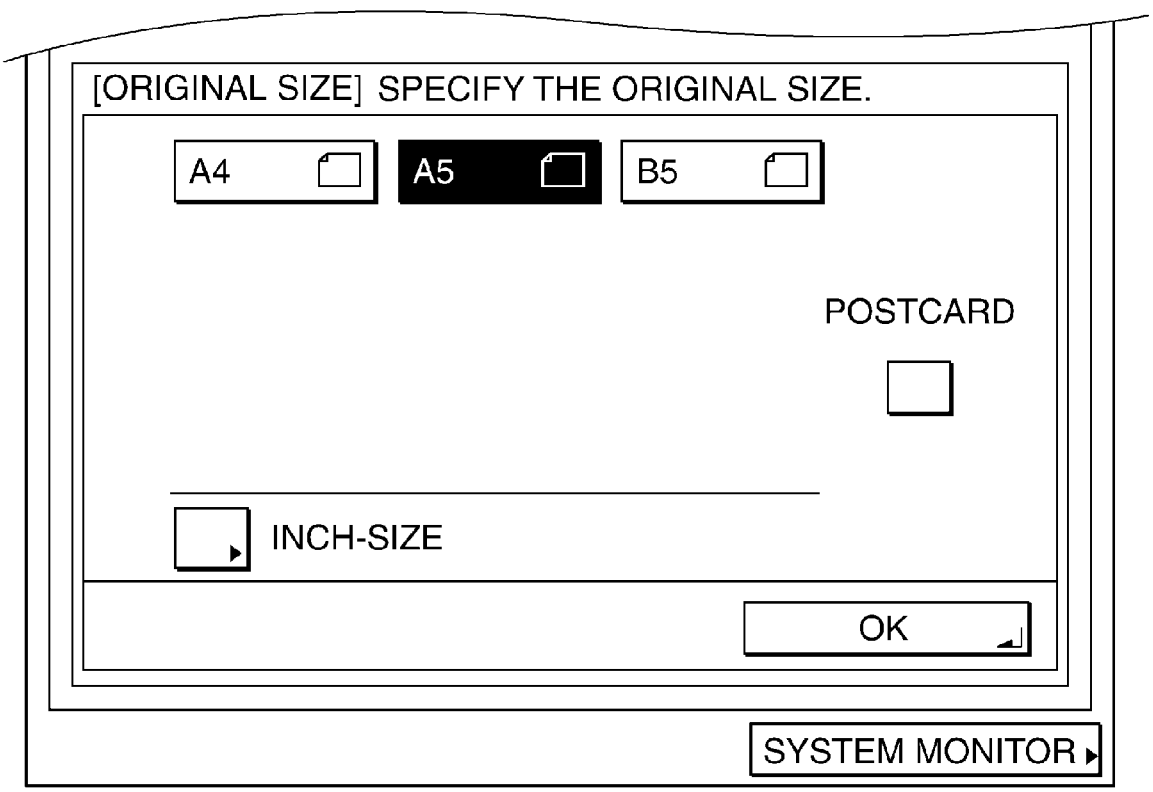
FIG. 12 is a view which is used in explaining an original size selection screen into which an original size input is inputted in the image forming apparatus of FIG. 1.

Also, if the CPU 170 determines that no preferential original size is registered in advance ("NO" in step S905), the CPU 170 controls the LCD 191 to display a screen to receive an original size input (step S907). For example, the CPU 170 carries out control such that an original size selection screen as shown in FIG. 12 is displayed to receive an original size designation from the user. The user inputs a desired original size by touching a button of, for example, "A4" or "B5" in FIG. 12.

Next, the CPU 170 regards the input original size as the original size and selects a sheet feeding source (step S908). For example, if the input size in step S907 is A5 and A5 papers are set in the cassette 1, the cassette 1 is selected as the sheet feeding source (step S909). Next, the CPU 170 executes feeding of an A5 paper from the cassette 1 selected in step S909, carries out image formation in the fed A5 paper according to the image data scanned in the scanner 115 and outputs the result (step S910).

It should be noted that, if there is no paper size corresponding to the original size in step S909, the CPU 170 makes the LCD 191 display that there are no suitable papers or display an instruction to supply the papers to the user. Further, in this case, the CPU 170 may be configured such that the user can selects papers to be used alternatively in copy processing (step S910).

It should be noted that the explanation in the flowchart of FIG. 9 according to the above-noted copy job processing describes that it is possible to detect only A4 originals of AB-type original sizes which can be handled by the image forming apparatus. However, the present invention is not limited to this, and it is needless to say that the present invention is applicable to different combinations between original sizes supported by the image forming apparatus and original types that can be detected by the image forming apparatus.

Also, as understood from the explanation in the flowchart of FIG. 9 according to this copy job processing, even in the case of an original of a size that cannot detected by the original size sensor, it is possible to estimate the original size from paper sizes that cannot be detected.

Next, a case will be explained where the above image forming apparatus is set to the specification for USA (United States of America) market. Whether the image forming apparatus is set to the specification for USA (United States of America) market may be set at the time of factory shipment or set using the user mode after factory shipment. Depending on whether the image forming apparatus is set to the specification for USA (United States of America) market, papers determined based on signals from the original size sensor change from A4, B5 and A5 papers to STMT, LTR and LGL papers. Here, in the image forming apparatus set to the specification for USA market, process to determine the original size at the start time of copy job will be explained with reference to the flowchart of FIG. 10, where: LTR originals are placed in the cassette 1; STMT originals are placed in the cassette 2; and the manual feeding tray is not used.

Figure 10:
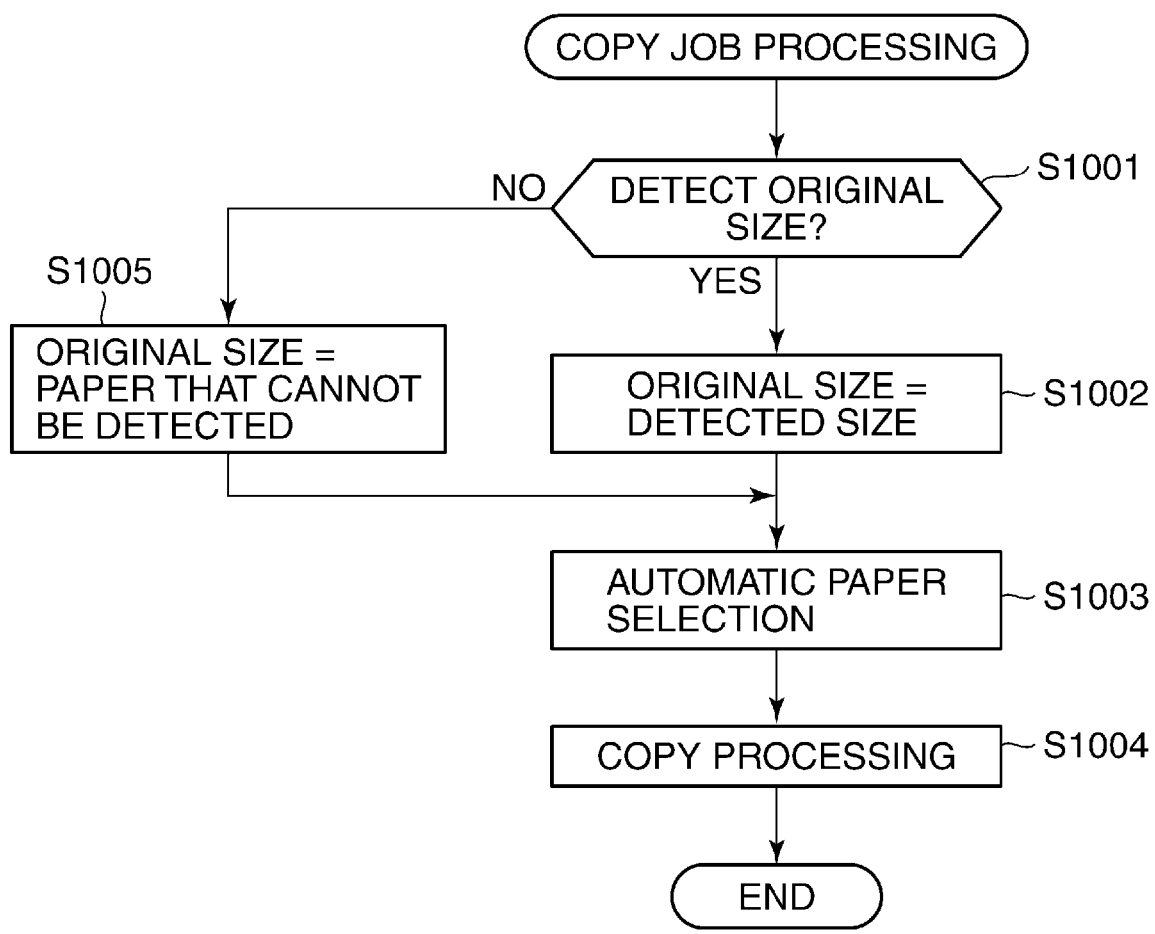
FIG. 10 is a flowchart showing copy job processing in the case of using LTR and STMT as original sizes in the image forming apparatus of FIG. 1 without using a manual feeding tray.

FIG. 10 is a flowchart showing copy job processing in the case of using LTR and STMT as original sizes in the image forming apparatus of FIG. 1 without using a manual feeding tray. Each step shown in the flowchart of FIG. 10 is carried out by executing, in the CPU 170, programs stored in the ROM 172.

This copy job processing is started when the LCD 191 receives an operation for staring the copy job. Then, first, the CPU 170 as a control unit checks whether the original size can be detected by the original size sensor 116 (step S1001).

Next, if the CPU 170 determines that the original size can be detected, the CPU 170 regards the original size detected by the original size sensor as the original size (step S1002). For example, in a case where a placed original is an LTR original, the cassette 1 of LTR papers corresponding to the original size is selected to carry out copy processing using the LTR original and the LTR papers of the cassette 1 (step S1003).

Here, if the CPU 170 determines the detected original size as "undetected" in step S1001 ("NO" in step S1001), the flow proceeds to step S1005.

Next, the CPU 170 determines the original size as STMT that is the paper size of the cassette 2 which cannot be detected by the original size sensor (step S1005).

Next, the CPU 170 selects, as a sheet feeding source, the cassette 2 of STMT papers corresponding to the size determined through automatic paper selection processing (step S1003).

Next, the CPU 170 feeds a paper from the feeding source selected in step S1003 and carries out copy processing to form an image on the fed paper according to the image data scanned in the scanner 115 (step S1004). Then, the present copy job processing is terminated.

It should be noted that the present invention is not limited to the operations shown in the flowchart of FIG. 10 described above, and it is needless to say that the present invention is applicable to the image forming apparatus handling different originals, paper sizes and number of cassettes.

Also, as understood from the explanation in the copy job processing shown in this FIG. 10, even in the case of an original of a size that cannot detected by the original size sensor, by estimating the original size from paper sizes that cannot be detected, it is possible to realize a copy automatic paper selection function without the user's designation of the original size.

It should be noted that, in the above embodiment, an example of carrying out determination processes of steps S903 and S905 in this order has been described, but the processing in step S905 may be carried out prior to the processing in step S903.

Next, a second embodiment will be explained. In the image forming apparatus according to the second embodiment, process related to copy job will be explained with reference to the flowchart of FIG. 11 in a case where: A4 originals are placed in the cassette 1; A5 originals are placed in the cassette 2; and B5 originals are placed in the manual feeding tray and the priority order of original sizes is registered.

Figure 11:
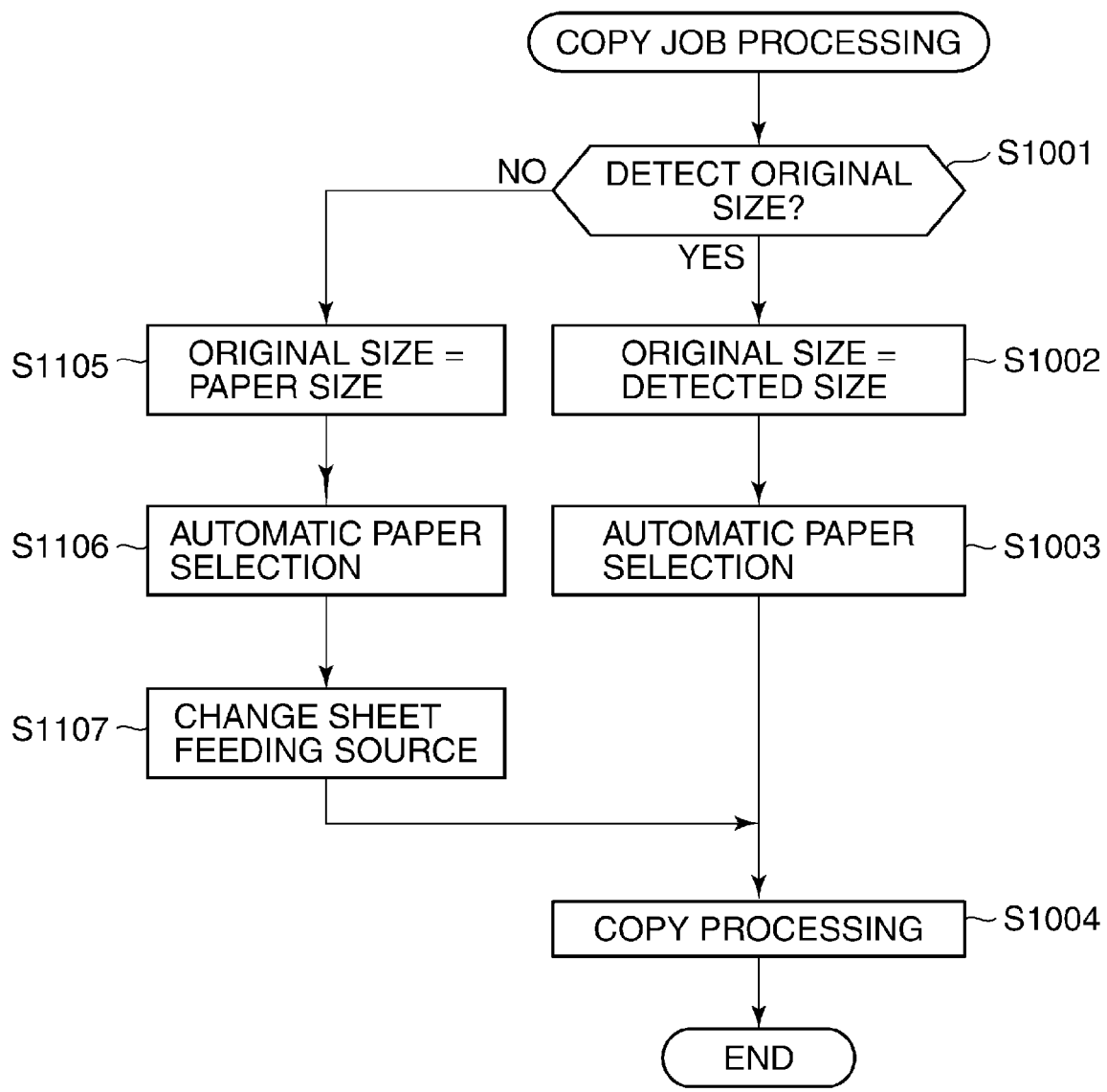
FIG. 11 is a flowchart showing copy job processing in the case where "A4" and "A5" are used as original sizes in the image forming apparatus of FIG. 1 and where "B5" is set in a manual feeding tray and registered thereon.

FIG. 11 is a flowchart showing copy job processing in the case where "A4" and "A5" are used as original sizes in the image forming apparatus of FIG. 1, where "B5" is set in a manual feeding tray and where the priority order of original sizes is registered.

Each step shown in the flowchart of FIG. 11 is carried out by executing, in the CPU 170, programs stored in the ROM 172. This copy job processing is started when the LCD 191 receives an operation for staring the copy job.

First, the CPU 170 as a control unit checks the original size based on a detection result obtained by using the original size sensor 116 (step S1101). For example, if the original size sensor 1 is turned on and the original size sensor 116 detects the presence of the original ("YES" in step S1101), the CPU 170 refers to FIG. 7 and determines the original size as A4 included in the detection result sizes shown in FIG. 7 (step S1102).

Next, the CPU 170 specifies suitable papers to record the scanned original, from the determined original size and paper size information on papers set in the cassette 147 or manual feeding tray 148, and selects a sheet feeding source in which papers of the designated size are set (step S1103). For example, the CPU 170 specifies, as a sheet feeding source, a cassette in which the same paper size as the original size determined through automatic paper selection processing is set to feed papers in a suitable size (in this case, A4 papers) for recording the original from the designated cassette.

Next, the CPU 170 carries out a scan of the A4 original, feeds papers (in this case, A4 papers) from the designated sheet feeding source and carries out copy processing (step S1104). After that, the CPU 170 terminates the present copy job processing.

By contrast with this, if the original size cannot be detected in step S1101 ("NO" in step S1101), the flow proceeds to step S1105 in the CPU 170.

Then, from the paper sizes of A5 and B5 which are set in the cassette 2 and manual feeding tray and which cannot be detected as the original size, the CPU 170 regards A5 of the cassette 2 as the original size according to the priority order of original sizes registered in advance (in the present embodiment, A5 has priority). This registered original size priority order is selected and registered in advance by the user in the original size selection screen shown in FIG. 12 described above. It should be noted that, although the A5 original size of the cassette 2 has priority, papers in the manual feeding tray may have priority or a larger paper size may have priority.

Figure 13:
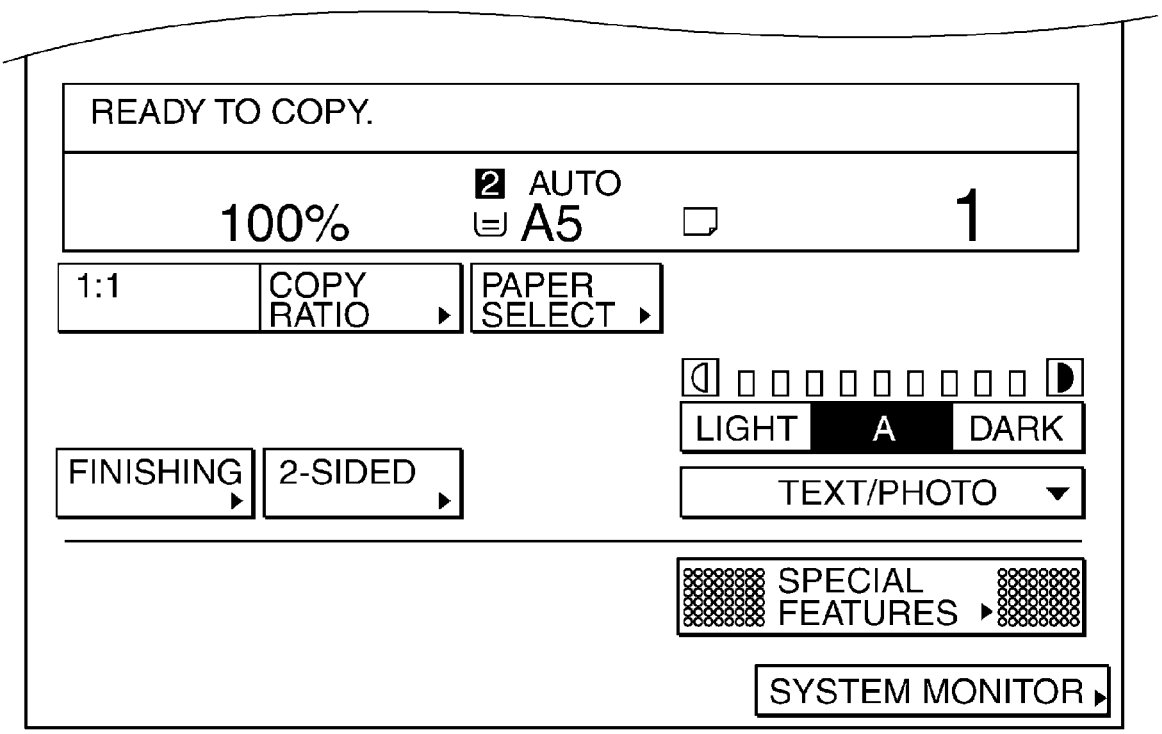
FIG. 13 is a view which is used in explaining a display screen to display sheet feeding stages set tentatively such that the user recognizes them, in the image forming apparatus of FIG. 1.

Next, through automatic paper selection processing, the CPU 170 selects the cassette 2 storing papers in the regarded original size (in this case, A5 size), as a sheet feeding source (step S1106). Here, the CPU 170 controls the LCD 191 to display a display screen on which the cassette 2 (A5) is selected as shown in FIG. 13, such that the user can recognize a tentatively set sheet feeding source. In the display screen example on which the cassette 2 (A5) is selected as shown in this FIG. 13, a sign of "2 AUTO A5" on the top center indicates that the A5 size of the cassette 2 is selected through automatic paper selection processing.

Figure 14:
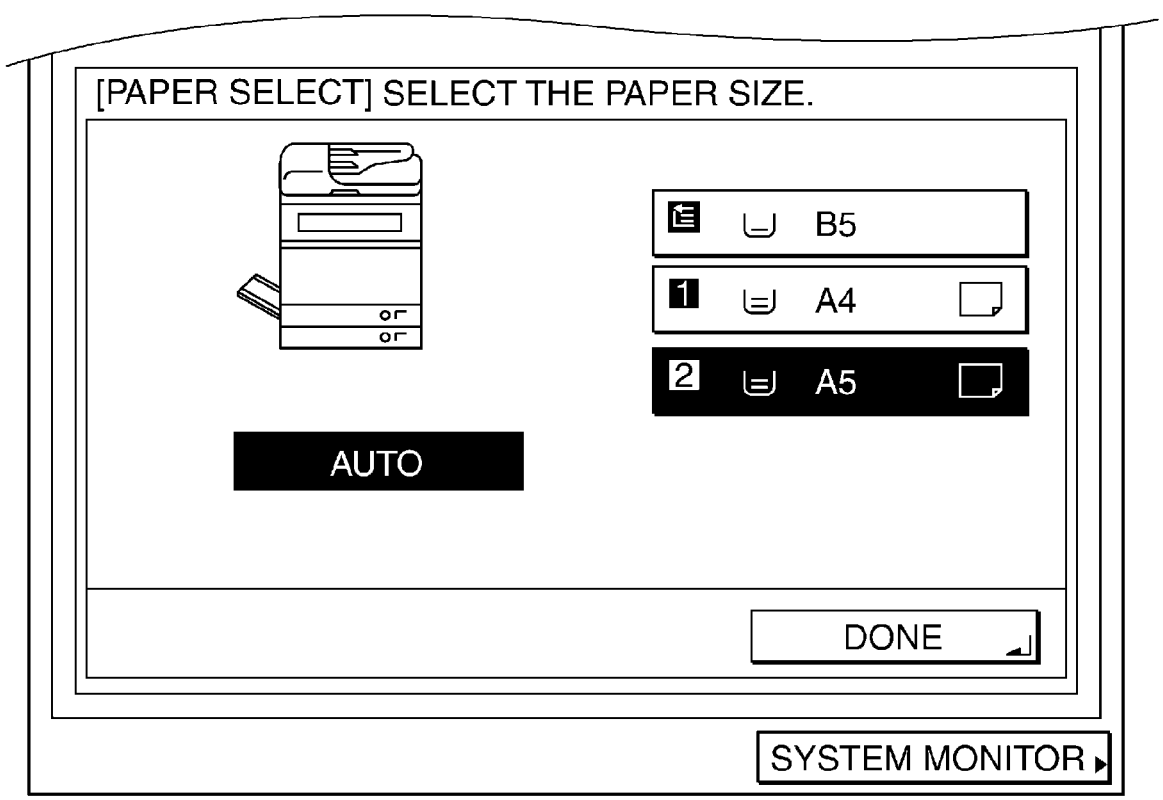
FIG. 14 is a view which is used in explaining a display screen that receives a sheet feeding stage changing order from the user in the image forming apparatus of FIG. 1.

Next, to receive a sheet feeding source change instruction from the user, the CPU 170 carries out screen display processing for sheet feeding source change on the LCD 191 as exemplified in FIG. 14 (step S1107). In this screen display, by touching a button portion of, for example B5, it is possible to change a paper size designation from the A5 size of the cassette 2 selected currently and tentatively.

Next, based on the size regarded as the original size or the size designated by the paper size designation, the CPU 170 performs scanning using the scanner 115 and obtains image data. Then, by the printer 145, the CPU 170 carries out image formation based on the image data obtained by scanning and outputs the result on a paper of the size regarded as the original size or the size designated by the paper size designation (step S1104).

It should be noted that the present invention is not limited to the operations shown in the flowchart of FIG. 11 described above, and it is needless to say that the present invention is applicable to the image forming apparatus with different conditions concerning an original size, a paper size, an original size that can be detected, and the like.

In short, the image forming apparatus according to the present embodiment determines an original size on the scanner 115 in accordance with each algorithm described above if the original size cannot be detected in the scanner 115.

In this image forming apparatus, the scanner 115 is provided with the original size sensor 116, and the cassette 147 and manual feeding tray 148 for sheet feeding in the printer 145 are each provided with a paper size detecting unit.

In this image forming apparatus, when an original is set in the scanner 115, the CPU 170 as a paper size judging unit judges whether there is a paper of a small original size that cannot be detected. Then, if the CPU 170 determines based on output patterns of the sensors of the original size sensor 116 that the original size cannot be detected, this image forming apparatus carries out each processing described above to determine the original size.

Here, a case where it is determined that the original size cannot be detected, denotes a case where the original cannot be detected by the original size sensor 116 because the size of the original set in the scanner 115 is too small to be detected.

In this case, the CPU 170 checks paper size information on papers set in the cassette 147 and manual feeding tray 148 for sheet feeding.

Then, the CPU 170 determines whether there is on the cassette 147 or manual feeding tray 148 for sheet feeding a copy paper of a smaller original size than the minimum original size that can be detected by the original size sensor 116. Then, if the CPU 170 determines that there is no copy paper of a smaller original size, the CPU 170 receives, from the user, an input of an original size to be processed and carries out printing according to the original size designated by the user.

If the CPU 170 as a paper size judging unit determines that there is only a single copy paper corresponding to a small original size, the CPU 170 makes the printer 145 of this image forming apparatus output a paper subjected to image formation according to the original size of the copy paper.

Further, if the CPU 170 determines that there are a plurality of copy papers corresponding to a small original size, the CPU 170 determines the original size based on predetermined priority order for original size determination and carries out printing.

Here, the priority order for original size determination is defined by one of processes shown below.

In a first process, as exemplified in FIG. 8, an original size registered by the user using an original size registering unit is prioritized. By this original size registering unit, the user uses an original size registration screen and preferentially registers a size selected from original sizes that cannot be detected by the original size sensor 116 such as items of "STMT," "B5" and "A5."

It should be noted that, if the priority order for original size determination is designated, the priority order may be designated in order from, for example, "STMT," "B5" to "A5." In this case, for example, if there is no paper of "STMT" on the cassette 147 and manual feeding tray 148 for sheet feeding, a paper of B5 size is used for printing.

In a second process, a paper placed on the manual feeding tray 148 is prioritized.

In a third process, a paper of the largest size is prioritized among a plurality of small original sizes that cannot be detected by the original size sensor 116 on the cassette 147 and manual feeding tray 148 for sheet feeding.

The image forming apparatus according to the present embodiment carries out image processing based on a size designated according to the priority order provided by one of the above first to third processes, supplies paper of the identified size, and prints images on the supplied papers.

By this means, the image forming apparatus according to the present embodiment suppresses the cost rise caused by increasing the number of sensors for original size detection so as to detect all original sizes. Further, in this image forming apparatus, even if there is an original size that cannot be detected, it is possible to automatically determine an original size without troubling the user to designate a paper to be used, so that it is possible to not degrade the operability.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2010-253899 filed Nov. 12, 2010, which is hereby incorporated by reference herein in its entirety.

What is claimed is:

1. An image forming apparatus having a plurality of paper supplying units, a first sensor, and a second sensor arranged away from the first sensor, for determining one of a first size, a second size, or a third size as a size of an original, the image forming apparatus comprising:
a determining unit configured to determine that the size of the original is:
the first size in a case where the first sensor detects the original and the second sensor does not detect the original;
the second size in a case none of the first sensor and the second sensor detect the original, and papers of the third size are not set on the plurality of supplying units; and
a size that is permitted to be designated by a user in a case none of the first sensor and the second sensor detect the original, and papers of both the second size and the third size are set on the plurality of paper supplying unit; and
an image forming unit configured to supply the papers from the paper supplying unit selected based on the size of the original determined by the determining unit and form an image of the original on the supplied paper.

2. The image forming apparatus as claimed in claim 1, wherein:
the size of the original designated by the user is registered in advance by the user, and
the determining unit determines the size registered in advance by the user as the original size in a case where the papers of both the second size and third size are set on the plural paper supplying units.

3. The image forming apparatus as claimed in claim 1, wherein:
the size of the original designated by the user is the size of the original that the user designates in a case where the papers of both the second size and third size are set on the plurality of paper supplying units, and
the determining unit determines the size of the original designated by the user as the original size in a case where the papers of both the second size and third size are set on the plurality of paper supplying units.

4. The image forming apparatus as claimed in claim 1, wherein the first and second sensors detect the size of the original placed on an automatic sheet feeding unit that transfers automatically the original to a position for reading the original.

5. The image forming apparatus as claimed in claim 1, wherein the first and second sensors detect the size of the original placed on a platen.

6. A method of controlling an image forming apparatus having a plurality of paper supplying units, a first sensor, and a second sensor arranged away from the first sensor, for determining one of a first size, a second size, or a third size as a size of an original, the method comprising:
a determining step of determining that the size of the original is:
the first size in a case where the first sensor detects the original and the second sensor does not detect the original;
the second size in a case where none of the first sensor and the second sensor detect the original, and papers of the third size are not set on the plurality of paper supplying units; and
a size that is permitted to be designated by a user in a case where none of the first sensor and the second sensor detect the original, and papers of both the second size and third size are set on the plurality of paper supplying units; and
an image forming step of supplying the papers from the paper supplying unit selected based on the size of the original determined in the determining step and forming an image of the original on the supplied paper.

* * * * *